United States Patent
Chanez et al.

(10) Patent No.: US 11,913,404 B2
(45) Date of Patent: Feb. 27, 2024

(54) NACELLE AIR OUTLET FOR AIRCRAFT TURBOJET ENGINE COMPRISING A STRAIGHTENING DEVICE FOR FACILITATING A REVERSE THRUST PHASE

(71) Applicant: SAFRAN AIRCRAFT ENGINES, Paris (FR)

(72) Inventors: Philippe Gérard Chanez, Moissy-Cramayel (FR); Daniel-Ciprian Mincu, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 0 days.

(21) Appl. No.: 17/758,650

(22) PCT Filed: Jan. 14, 2021

(86) PCT No.: PCT/EP2021/050736
§ 371 (c)(1),
(2) Date: Jul. 12, 2022

(87) PCT Pub. No.: WO2021/156036
PCT Pub. Date: Aug. 12, 2021

(65) Prior Publication Data
US 2023/0038787 A1 Feb. 9, 2023

(30) Foreign Application Priority Data
Feb. 3, 2020 (FR) ...................................... 2001026

(51) Int. Cl.
*F02K 1/66* (2006.01)
*B64D 27/16* (2006.01)
(Continued)

(52) U.S. Cl.
CPC ................ *F02K 1/32* (2013.01); *B64D 27/16* (2013.01); *B64D 29/00* (2013.01); *F02K 1/66* (2013.01)

(58) Field of Classification Search
CPC ..................................... F02K 1/64; F02K 1/66
See application file for complete search history.

(56) References Cited

U.S. PATENT DOCUMENTS

| 3,040,524 A | 6/1962 | Kurti |
| 3,747,341 A * | 7/1973 | Davis ....................... F02K 3/06 239/265.31 |

(Continued)

FOREIGN PATENT DOCUMENTS

| FR | 2120172 A1 | 8/1972 |
| FR | 2162257 A1 | 7/1973 |
| GB | 1360238 A | 7/1974 |

OTHER PUBLICATIONS

Search Report from the French Intellectual Property Office on corresponding FR application (FR2001026) dated Oct. 12, 2020.
(Continued)

*Primary Examiner* — Gerald L Sung
(74) *Attorney, Agent, or Firm* — KOS IP LAW LLP

(57) ABSTRACT

Disclosed is an air outlet of a nacelle for an aircraft turbojet engine, the nacelle forming a solid of revolution about a longitudinal axis, the air outlet having a straightening device having a plurality of flaps mounted circumferentially and protruding, each flap being mounted pivoting around a pivot axis, forming, with respect to the longitudinal axis, an angle of convergence in a radial plane, between a closed position, in which each flap extends along the pivot axis in the aerodynamic prolongation of the trailing edge in order to support a thrust phase and a deployed position, in which each flap extends in a deployed plane forming an angle of
(Continued)

deployment with respect to the closed position about the pivot axis, so as to support a reverse thrust phase.

19 Claims, 7 Drawing Sheets

(51) Int. Cl.
*B64D 29/00* (2006.01)
*F02K 1/32* (2006.01)

(56) References Cited

U.S. PATENT DOCUMENTS 3,988,889 A * 11/1976 Chamay ............... F02K 1/66
 60/771
5,090,196 A * 2/1992 Balzer ................. F02K 1/66
 60/230
5,568,724 A * 10/1996 Lindner ............... F02K 1/66
 415/914

OTHER PUBLICATIONS

International Search Report and Written Opinion on corresponding PCT application (PCT/EP2021/050736) from International Searching Authority (EPO) dated Apr. 26, 2021.

* cited by examiner

NACELLE AIR OUTLET FOR AIRCRAFT TURBOJET ENGINE COMPRISING A STRAIGHTENING DEVICE FOR FACILITATING A REVERSE THRUST PHASE

TECHNICAL FIELD

The present invention relates to the field of aircraft turbojet engines and more particularly targets a nacelle air outlet for aircraft turbojet engine comprising a straightening device for facilitating a reverse thrust phase.

In a known manner, an aircraft comprises one or more turbojet engines configured to enable the propulsion of the aircraft from the acceleration of an air flow circulating from upstream to downstream in each turbojet engine during a thrust phase, called inner air flow. Hereafter, the terms "upstream" and "downstream" are defined with respect to the direction of circulation of the inner air flow during a thrust phase.

In a known manner, with reference to FIG. 1, an aircraft bypass turbojet engine (also known as turbofan engine) 100 is represented extending along a longitudinal axis X and comprising a fan 500 rotationally mounted around the longitudinal axis X and configured, during a thrust phase P1 of the turbojet engine 100, to accelerate the inner air flow F-INT. The turbojet engine 100 also comprises downstream of the fan 500 a primary flow path 600, radially inner, and a secondary flow path 700, radially outer, which are separated by a casing 800. The casing 800 is configured to guide a first part of the inner air flow F-INT, called primary air flow F1, in the primary flow path 600 for the combustion of the fuel and a second part of the inner air flow F-INT, called secondary air flow F2, in the secondary flow path 700 in order to generate the thrust of the turbojet engine 100. Hereafter, the terms "inner" and "outer" are defined along the radial direction with respect to the longitudinal axis X.

In a known manner, still with reference to FIG. 1, an aircraft propulsion assembly 900 is represented which comprises a turbojet engine 100 and a nacelle 200 forming a revolution around the longitudinal axis X of the turbojet engine 100 in a radially outer manner to the fan 500 and delimiting in a radially outer manner the secondary flow path 700. The nacelle 200 comprises at its upstream end an air inlet 300 and at its downstream end an air outlet 400. The air inlet 300 comprises an upstream inner wall 310 turned towards the longitudinal axis X and an upstream outer wall 320 opposite to the upstream inner wall 310, connected together upstream by an air inlet lip 330 comprising a leading edge, so as to form an upstream annular cavity 340. The air inlet 300 has an aerodynamic rounded profile which makes it possible to separate an upstream air flow F into the inner air flow F-INT guided by the upstream inner wall 310 and an outer air flow F-EXT guided by the upstream outer wall 320.

In a known manner and analogous to the air inlet 300, still with reference to FIG. 1, the air outlet 400 of the nacelle 200 comprises a downstream inner wall 410 turned towards the longitudinal axis X and a downstream outer wall 420 opposite to the downstream inner wall 410, connected together downstream by a trailing edge 430. The air outlet 400 comprises a profile tapering downstream which makes it possible to guide the secondary air flow F2 from the secondary flow path 700 to the exterior of the turbojet engine 100.

To reduce the braking distance of an aircraft, notably during landing, it is known to integrate in a nacelle 200 a thrust reverse system which makes it possible to modify the orientation of the secondary air flow F2 at the exhaust so as to realize a reverse thrust phase.

In a known manner, the reverse thrust phase may by realized by an opening of hatches and/or grids in the secondary flow path 700, downstream of the fan 500, in order to reconduct the secondary air flow to the exterior of the turbojet engine 100 in a radial manner with respect to the longitudinal axis X or towards the upstream. For a turbojet engine 100 with high bypass ratio, that is to say of which the ratio of the mass of the secondary air flow F2 over the mass of the primary air flow F1 is greater than 16, the nacelle 200 comprises an important diameter and it is not desired to integrate a thrust reverser system with hatches and/or grids given that this would penalize in an important manner the mass, the bulk and the drag of the turbojet engine 100.

Another solution for reducing the braking distance of an aircraft consists in providing a variable pitch fan (VPF) 500. Such a fan 500 comprises blades of which the angular inclination is controlled in such a way as to make it possible to reverse the direction of circulation of the secondary air flow F2 in the secondary flow path 700 enabling the deceleration of the aircraft, notably during landing.

With reference to FIG. 2, during a reverse thrust phase P2, a reverse air flow F-INV withdrawn from the outer air flow F-EXT is admitted at the level of the trailing edge 430 of the air outlet 400 of the nacelle 200 and circulates from downstream to upstream in the secondary flow path 700, that is to say opposite to the secondary air flow F2 of FIG. 1. The reverse air flow F-INV coming from the secondary flow path 700 next traverses the fan 500 and is guided upstream by the upstream inner wall 310 of the air inlet 300. The reverse air flow F-INV then opposes the upstream air flow F, notably in a radially outer manner, which enables a braking. In certain cases, as well as in thrust phase P1, an inner air flow F-INT coming from the upstream air flow F circulates from upstream to downstream in the nacelle 200, in a radially inner manner and in opposite direction with respect to the reverse air flow F-INV, in order to supply the primary air flow F1. The primary air flow F1 may also be supplied by a part of the reverse air flow F-INV which bypasses the casing 800.

In practice, as illustrated in FIGS. 2 and 3, the blades of the fan 500 drive the reverse air flow F-INV according to a twisted motion V along the longitudinal axis X at the level of the air inlet 300. Such a twisted motion V is capable of being transmitted to the outer air flow F-EXT guided by the upstream outer wall 320 of the air inlet 300 and flowing from upstream to downstream along the nacelle 200. The outer air flow F-EXT is next withdrawn at the level of the air outlet 400 of the nacelle 200 to form the reverse air flow F-INV. The reverse air flow F-INV admitted into the secondary flow path 700 thus also comprises a twisted motion V' transmitted by the outer air flow F-EXT, which is not optimal because it reduces the reverse thrust performances.

Furthermore, still with reference to FIGS. 2 and 3, the tapered profile of the air outlet 400, aerodynamic in thrust phase P1, generates in reverse thrust phase P2 recirculation zones R in the secondary flow path 700 at the level of the air outlet 400. More precisely, the outer air flow F-EXT coming from upstream disengages from the downstream outer wall 420 and bypasses the trailing edge 430 to enter into the air outlet 400 and form the reverse air flow F-INV. Such recirculation zones R reduce the quantity of reverse air flow F-INV admitted into the air outlet 400, which reduces the reverse thrust performances.

To increase the quantity of reverse air flow F-INV admitted into the air outlet 400, a nacelle is known from the patent application FR2120172A1, and more precisely from the fifth embodiment illustrated in FIGS. 11 and 12, comprising flaps mounted projecting on the periphery of the trailing edge of the air outlet. Such flaps are pivotably mounted along a tangential axis orthogonal to the radius of the nacelle between a closed position adapted for a thrust phase and a deployed position adapted for a reverse thrust phase. More precisely, in the closed position, the flaps extend along the axis of the nacelle in the extension of the air outlet whereas, in the deployed position, the flaps extend along a radial direction turned towards the exterior of the nacelle. A reverse air flow F-INV having a twisted motion V is capable of being admitted into the turbojet engine 1.

Incidentally, a nacelle is known from the same patent application, and more precisely from the first embodiment illustrated in FIGS. 1 to 3, comprising a thrust reverser system mounted in a median peripheral opening formed in the nacelle downstream of the fan. This thrust reverser system comprises flappers mounted on the periphery of the opening by means of pivots of axis parallel to the axis of the nacelle which are fixed upstream and downstream of the opening. The flappers are pivotably mounted between a closed position adapted to a thrust phase, wherein the flappers overlap each other so as to close the opening in the wall of the nacelle, and a deployed position adapted to a reverse thrust phase, wherein the flappers extend substantially radially with respect to the axis of the nacelle. Such a thrust reverser system cannot however be envisaged for a turbojet engine 100 with high bypass ratio because that would penalize in an important manner the mass, the bulk and the drag of the turbojet engine 100.

Incidentally, a thrust reverser mechanism is known from the patent application U.S. Pat. No. 3,040,524A, pivotably mounted on the outer casing of the turbojet engine so as to extend in operating position:
  into the air outlet of the nacelle in the embodiment illustrated in FIG. 1, or
  into an opening of the nacelle in the embodiment of FIGS. 3 and 4. Such a patent application does not relate to a nacelle and, even less so, to an air outlet.

The invention thus targets a nacelle air outlet for aircraft bypass turbojet engine making it possible to increase the performances of the turbojet engine during a reverse thrust phase, without reducing the performances in thrust phase.

SUMMARY

The invention relates to a nacelle air outlet for aircraft bypass turbojet engine, said turbojet engine extending along a longitudinal axis and comprising a radially inner primary flow path and a radially outer secondary flow path wherein circulates a secondary air flow from upstream to downstream during a thrust phase and a reverse air flow from downstream to upstream during a reverse thrust phase, said nacelle forming a revolution around the longitudinal axis of the turbojet engine and comprising at its downstream end the air outlet, said air outlet comprising a downstream inner wall, turned towards the longitudinal axis and configured to externally delimit the secondary flow path and to guide the secondary air flow and the reverse air flow, and a downstream outer wall, opposite to the downstream inner wall and configured to guide an outer air flow circulating from upstream to downstream, said downstream inner wall and said downstream outer wall being connected together downstream by a trailing edge.

The invention is remarkable in that the air outlet comprises a straightening device comprising a plurality of flaps mounted on the trailing edge and extending projecting downstream, each flap being pivotably mounted along a pivoting axis forming with respect to the longitudinal axis an angle of convergence comprised between 0° and 45° in a radial plane, each flap being pivotably mounted between:
  a closed position, wherein each flap extends along the pivoting axis in the aerodynamic extension of the trailing edge to facilitate the thrust phase, and
  at least one deployed position, wherein each flap extends in a deployed plane forming an angle of deployment with respect to the closed position around the pivoting axis, said angle of deployment being greater than 20°, in order to straighten the reverse air flow admitted into the air outlet, so as to facilitate the reverse thrust phase.

Thanks to the invention, during a reverse thrust phase, the outer air flow withdrawn at the level of the air outlet of the nacelle to form the reverse air flow circulates between the flaps in deployed position, which straightens the flow before its admission into the secondary flow path. The twisted motion of the reverse air flow brought about by the blades of the fan at the level of the air inlet and transmitted to the outer air flow is thus modified at the level of the flaps, which avoids admitting a twisted motion reverse air flow into the secondary flow path. The performances in reverse thrust phase are thus increased, which enables efficient braking, but also protects from pumping and facilitates the operability of the aircraft in unfavorable meteorological conditions.

Further, in deployed position, the appearance of recirculation in the secondary flow path at the level of the air outlet is reduced, which also facilitates the reverse thrust phase. Furthermore, in deployed position, the diameter of the air outlet is increased, which makes it possible to increase the flow rate of reverse air flow admitted into the secondary flow path. Finally, in closed position, the flaps extend into the extension of the air outlet which makes it possible to conduct along an aerodynamic profile the secondary air flow outwards and thus to maintain the thrust phase performances.

Preferably, the angle of convergence is less than 20°, preferentially less than 15° so as to conserve the thrust phase performances and so that, in reverse thrust phase, the admission of the reverse air flow into the secondary flow path is substantially longitudinal to maximize it.

According to a preferred aspect of the invention, the straightening device comprises at least 10 flaps, preferably at least 30 flaps. Such a number of flaps is sufficiently large to make it possible to modify efficiently the twisted motion of the reverse air flow at numerous points of the circumference of the air outlet. Preferably, the number of flaps is less than 50 to facilitate their control and to ensure they have a sufficient size to guarantee their robustness faced with the turbulence of the external air and to shocks and vibrations linked to an aeronautic environment.

According to another preferred aspect of the invention, the angle of deployment is comprised between 30° and 135°, preferably comprised between 40° and 90°. Preferably, the optimal angle of deployment varies between 40° and 90°, depending on the engine speed and on the direction of gyration of the engine as well as the quantity of reverse air flow that it is wished to admit into the secondary flow path. Such an angle of deployment advantageously makes it possible to modify efficiently the twisted motion of the reverse air flow and to ensure its admission into the secondary flow path along a substantially longitudinal profile.

According to one aspect of the invention, in closed position, the flaps are mounted converging along the longitudinal axis oriented from upstream to downstream. Such flaps have the advantage of increasing the section of the air outlet in deployed position by comparison with the closed position, which increases the flow rate of reverse air flow admitted into the air outlet.

According to a preferred aspect of the invention, each flap comprises, in closed position, an inner wall extending in the extension of the inner wall aval of the air outlet so as to guide the inner air flow and an outer wall extending in the extension of the downstream outer wall of the air outlet so as to guide the outer air flow, said inner wall and said outer wall being connected by a top forming a trailing end in closed position. Advantageously, each flap comprises in closed position a tapered profile extending in the continuity of the air outlet, which makes it possible to conserve the thrust phase performances. Further, in reverse thrust phase, the downstream inner wall and the downstream outer wall of two facing flaps delimit a circulation corridor for the outer air flow before being admitted into the secondary flow path. Such circulation corridors advantageously facilitate the flow of the reverse air flow along a substantially longitudinal direction in the secondary flow path.

According to a first aspect of the invention, in closed position, the flaps are mounted adjacently with respect to one another so as to form together a ring along the longitudinal axis. Advantageously, in closed position, such a straightening device reproduces the air outlet of the prior art and thus conserves the thrust phase performances. In reverse thrust phase, such a straightening device makes it possible to modify the twisted motion of the reverse air flow in an overall manner over the entire circumference of the air outlet.

Preferably, the flaps are evenly distributed on the trailing edge to modify the twisted motion of the reverse air flow homogeneously over the entire circumference of the air outlet.

According to one aspect of the invention, the flaps comprising a width defined as their circumferential length in closed position, the flaps overlap each other in closed position, preferably partially, preferably over less than 25% of their width. Advantageously, such an overlap guarantees the sealing of the straightening device in thrust phase, that is to say when the flaps are in closed position.

According to a second aspect of the invention, the straightening device comprises at least one spline fixedly mounted on the trailing edge and extending projecting downstream, said spline and the flaps in closed position being mounted adjacently with respect to one another so as to form together a ring along the longitudinal axis. Preferably, the straightening device comprises a plurality of splines fixedly mounted on the trailing edge and extending projecting downstream, said splines and the flaps in closed position being mounted adjacently with respect to one another so as to form together a ring along the longitudinal axis. Advantageously, in closed position, such a straightening device reproduces the air outlet of the prior art and thus conserves the thrust phase performances. In reverse thrust phase, each spline increases the mechanical strength of the straightening device. Such a straightening device further makes it possible to modify the twisted motion of the reverse air flow in a targeted manner on the circumference of the air outlet.

Preferably, at least one spline is arranged between two flaps along a circumferential direction in order to ensure an optimal mechanical strength of the straightening device.

According to one aspect, in closed position, at least one flap is in radial abutment against a spline, preferably over less than 25% of its width defined as its circumferential length in closed position. Advantageously, a spline makes it possible both to increase the robustness of the straightening device but also to serve as abutment for the flaps in closed position. In other words, a spline makes it possible to guarantee the sealing of the straightening device in thrust phase while avoiding that the flaps open in an inopportune manner.

According to a preferred aspect, the straightening device comprises an alternation of flaps and splines mounted on the trailing edge along a circumferential direction, to modify the twisted motion of the reverse air flow homogeneously with a robust straightening device over the entire circumference of the air outlet.

According to another preferred aspect, the flaps are mounted on one or more given portion(s) of the circumference of the trailing edge in order to modify the twisted motion of the reverse air flow in a targeted manner at the level of the given portion(s). Such a straightening device thus makes it possible to eliminate targeted local recirculation zones. Preferably, the splines are mounted on the complementary portion(s) on which are mounted the flaps, so that in thrust phase, the straightening device forms an aerodynamic longitudinal ring of axis X.

According to one aspect, a spline extends over an angular portion of the circumference of the trailing edge forming an angle less than 360°, preferably less than 30°.

According to one aspect of the invention, the straightening device comprises at least one pivoting member configured to pivot at least one flap, preferably a single pivoting member configured to pivot a plurality of flaps simultaneously. Advantageously, the pivoting member makes it possible to pivot the flaps in a simple and practical manner. The use of a single pivoting member further makes it possible to pivot the flaps simultaneously and according to the same angle of deployment, which favors the thrust phase and the reverse thrust phase. In addition, such a single pivoting member facilitates and shortens the transition time from a thrust phase to a reverse thrust phase and vice versa.

Preferably, the straightening device comprises pivots on which are mounted the flaps along the pivoting axis, each pivot being connected upstream to a pivoting member and extending cantilevered downstream. Such pivots make it possible to pivot the flaps easily while having a minimum bulk. Preferentially, the pivots comprise a diameter greater than 10 mm to support the flaps and the turbulence of the external air and the vibrations and shocks linked to the aeronautic environment.

According to one aspect of the invention, each flap is pivotably mounted along a pivoting axis central to said flap. In other words, each flap is mounted on a pivot centered with respect to the width of said flap. A pivoting member advantageously provides a minimal force to pass from a thrust phase to a reverse thrust phase and vice versa.

According to an alternative aspect of the invention, each flap comprising a width defined as its circumferential length in closed position, each flap is pivotably mounted along an off-centered pivoting axis with respect to the width.

According to another alternative aspect of the invention, each flap comprising an extended portion of flap and a reduced portion of flap separated by the off-centered pivoting axis, the extended portion of flap is able to be overlapped in closed position. Preferably, the extended portion of flap of each flap is able to be overlapped by the reduced portion of flap of an adjacent flap. Advantageously, this makes it possible to guarantee the sealing of the straightening device in thrust phase. Indeed, the secondary air flow circulating in the secondary flow path exerts a greater outwards radial pressure force on each extended portion of flap which generates an inwards radial pressure force on each reduced portion of flap. An extended portion of flap that would tend to deploy is thus retained by the reduced portion of flap overlapping it. Further, such flaps have the advantage of being able to be folded down from the deployed position to the closed position without the help of a pivoting member by advantageously using the secondary air flow and more precisely the outwards radial force that it exerts.

The invention also relates to a nacelle for aircraft bypass turbojet engine, said turbojet engine extending along a longitudinal axis and comprising a radially inner primary flow path and a radially outer secondary flow path wherein circulates a secondary air flow from upstream to downstream during a thrust phase and a reverse air flow from downstream to upstream during a reverse thrust phase, said nacelle forming a revolution around the longitudinal axis of the turbojet engine and comprising at its downstream end an air outlet such as described previously.

The invention relates in addition to an aircraft propulsion assembly comprising an aircraft bypass turbojet engine extending along a longitudinal axis and comprising a radially inner primary flow path and a radially outer secondary flow path wherein circulates a secondary air flow from upstream to downstream during a thrust phase and a reverse air flow from downstream to upstream during a reverse thrust phase, said aircraft propulsion assembly comprising a nacelle such as described previously mounted on the turbojet engine.

Preferably, the turbojet engine comprises thrust reversal means, preferentially a fan comprising variable pitch blades. Also preferably, the turbojet engine comprises a bypass ratio greater than 16, that is to say that the nacelle comprises a large diameter. Advantageously, such a turbojet engine is efficient in reverse thrust phase because all of the reverse air flow admitted into the air outlet is straightened efficiently. The thrust reversal in the case of a nacelle of large diameter cannot in fact be carried out efficiently by a hatch and/or grid opening formed in the secondary flow path but requires a variable pitch fan, which does not penalize the mass of the turbojet engine. The straightening device is adapted to a fan comprising variable pitch blades in that the flaps are configured to modify the twisted motion that it generates.

The invention furthermore relates to an aircraft comprising at least one propulsion assembly such as described previously.

The invention furthermore relates to a method for using an aircraft propulsion assembly such as described previously, wherein at least one flap is in closed position during a thrust phase of the turbojet engine, the method comprising, during a reverse thrust phase of said turbojet engine, at least one step of pivoting said flap from the closed position to the deployed position.

The invention relates in particular to a method for using an aircraft propulsion assembly such as described previously, wherein the pitch angle of the blades of the fan of the turbojet engine is adapted for a thrust phase and at least one flap is in closed position, the method comprising a step of modification of the pitch angle of the blades of the fan so as be adapted to a reverse thrust phase of the turbojet engine and at least one step of pivoting said flap from the closed position to the deployed position.

Preferably, the pitch angle of the blades of the fan of the turbojet engine being adapted for a reverse thrust phase and at least one flap being in deployed position, the method comprises a step of reverse modification of the pitch angle of the blades of the fan so as to adapt said turbojet engine to a thrust phase and at least one step of reverse pivoting said flap from the deployed position to the closed position.

Advantageously, such a method makes it possible to adapt the profile of the air outlet depending on whether the aircraft turbojet engine is in thrust phase or in reverse thrust phase, so that the profile of the air outlet is aerodynamic for each of the phases. Further, the passage from the closed position to the deployed position and vice versa is realized in a simple, practical and rapid manner by simple pivoting.

Preferably, the pivoting step is implemented by the pivoting member. Preferably, in the case of a flap of central pivoting axis, the reverse pivoting step is implemented by the pivoting member. Preferably, in the case of a flap of off-centered pivoting axis, the reverse pivoting step is implemented autonomously by the flap thanks to the secondary air flow and more precisely the outwards radial pressure force that it exerts.

Preferably, all the flaps are pivoted during the pivoting step and/or the reverse pivoting step, preferentially simultaneously, preferentially according to the same angle of deployment.

BRIEF DESCRIPTION OF THE DRAWINGS

The invention will be better understood on reading the description that follows, given uniquely as an example, and by referring to the appended drawings given as non-limiting examples, wherein identical references are given to similar objects and in which.

It should be noted that the figures set out the invention in a detailed manner for implementing the invention, said figures obviously being able to serve to better define the invention if necessary.

DETAILED DESCRIPTION

Figure 4:
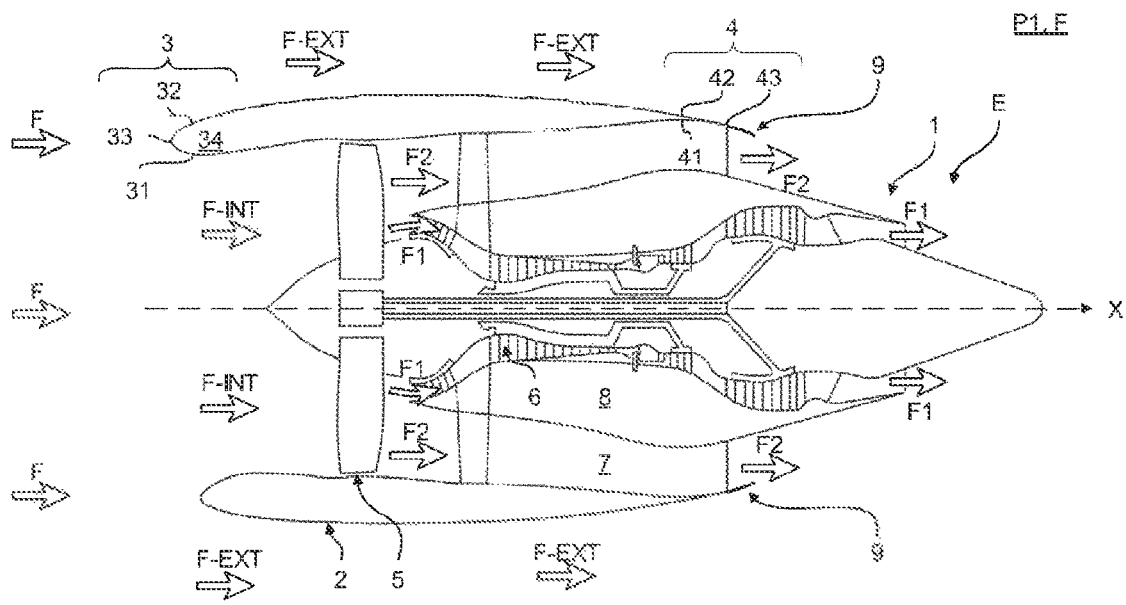
FIG. 4 is a longitudinal schematic representation of an aircraft propulsion assembly during a thrust phase of the bypass turbojet engine according to one embodiment of the invention.

With reference to FIG. 4 and as described in the preamble, an aircraft propulsion assembly E is represented comprising a bypass turbojet engine 1 extending along a longitudinal axis X and configured to enable the propulsion of the aircraft from the acceleration of an air flow circulating from upstream to downstream in each turbojet engine during a thrust phase P1, called inner air flow F-INT. Hereafter, the terms "upstream" and "downstream" are defined with respect to the direction of circulation of the inner air flow F-INT during a thrust phase P1. The turbojet engine 1 comprises a fan 5 rotationally mounted around the longitudinal axis X and configured, during a thrust phase P1 of the turbojet engine 1, to accelerate the inner air flow F-INT. The turbojet engine 1 also comprises downstream of the fan 5 a primary flow path 6, radially inner, and a secondary flow path 7, radially outer, which are separated by a casing 8. The casing 8 is configured to guide a first part of the inner air flow F-INT, called primary air flow Fl, in the primary flow path 6 for the combustion of the fuel and a second part of the inner air flow F-INT, called secondary air flow F2, in the secondary flow path 7 in order to generate the thrust of the turbojet engine 1. Hereafter, the terms "inner" and "outer" are defined along the radial direction with respect to the longitudinal axis X.

Figure 5:
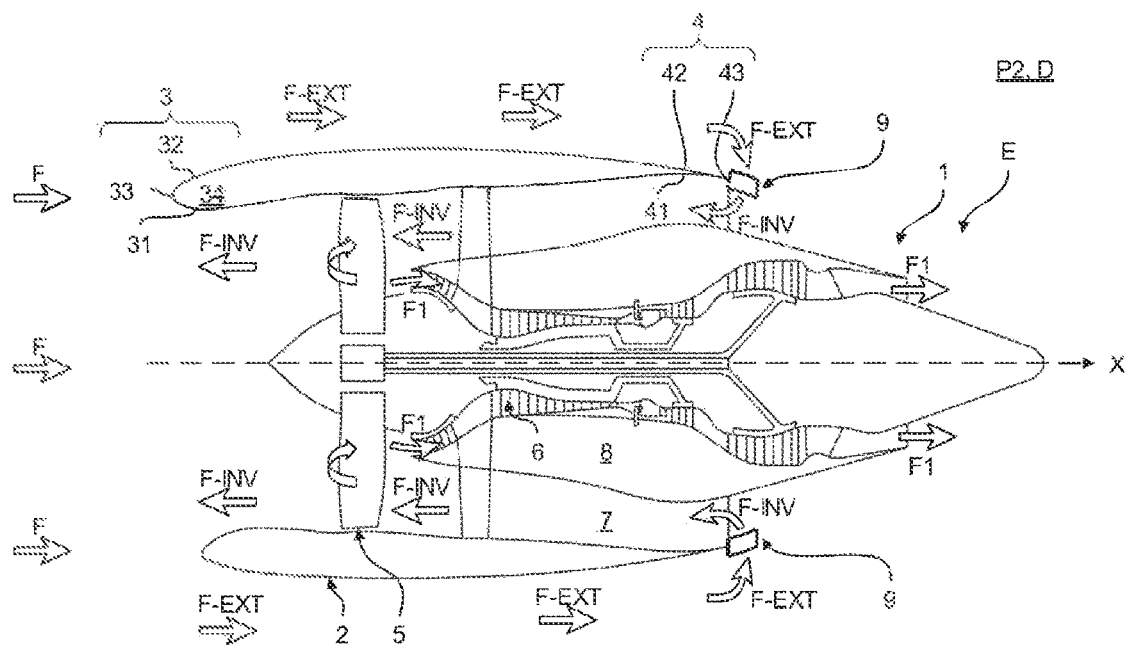
FIG. 5 is a longitudinal schematic representation of the aircraft propulsion assembly of FIG. 4 during a reverse thrust phase of the bypass turbojet engine.

It is considered hereafter that the turbojet engine 1 has a high bypass ratio, that is to say that the ratio of the mass of the secondary air flow F2 over the mass of the primary air flow Fl is greater than 16, and that the fan 5 is a variable pitch fan (VPF). As illustrated in FIG. 5, such a fan 5 is configured to enable a reverse thrust phase P2 enabling the deceleration of the aircraft, notably during landing. To do so, the fan 5 comprises blades of which the angular inclination is controlled so as to make it possible to reverse the direction of circulation of the secondary air flow F2 in the secondary flow path 7. During a reverse thrust phase P2, a reverse air flow F-INV thus circulates from downstream to upstream in the secondary flow path 7, that is to say opposite to the secondary air flow F2 of FIG. 4. Reverse thrust means being in the form of a variable pitch fan are described but it goes without saying that the reverse thrust means could have a different form.

With reference to FIGS. 4 and 5, the aircraft propulsion assembly E further comprises a nacelle 2 forming a revolution around the longitudinal axis X in a radially outer manner to the fan 5 and delimiting in a radially outer manner the secondary flow path 7. The nacelle 2 comprises at its upstream end an air inlet 3 and at its downstream end an air outlet 4. The air inlet 3 comprises an upstream inner wall 31 turned towards the longitudinal axis X and an upstream outer wall 32 opposite to the upstream inner wall 31, connected together upstream by an air inlet lip 33 comprising a leading edge, so as to form an upstream annular cavity 34.

Figure 6:
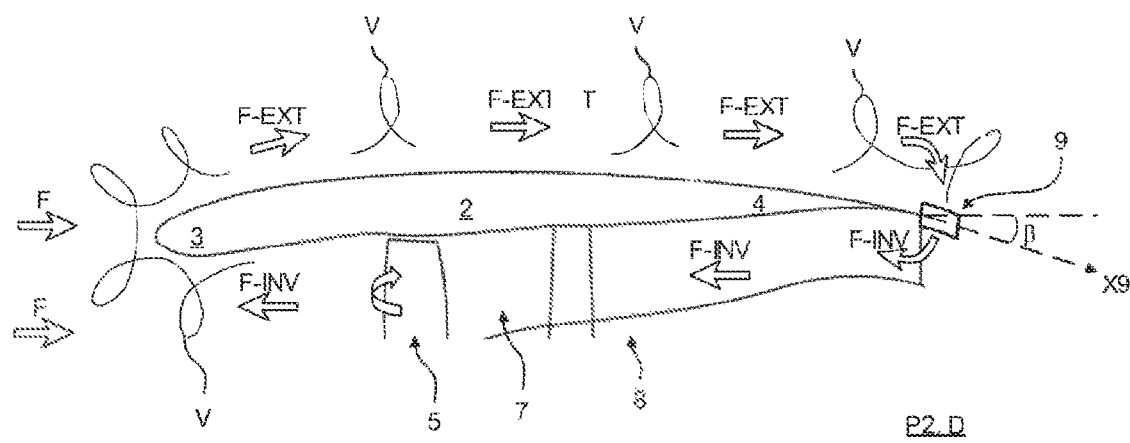
FIG. 6 is a schematic representation in longitudinal half-section of a nacelle of the propulsion assembly of FIG. 5.

As illustrated in FIG. 4, during a thrust phase P1 of the turbojet engine 1, the air inlet 3 comprises an aerodynamic rounded profile which makes it possible to separate an upstream air flow F into an inner air flow F-INT guided by the upstream inner wall 31 and an outer air flow F-EXT guided by the upstream outer wall 32. During a reverse thrust phase P2 of the turbojet engine 1, as illustrated in FIG. 6, the upstream inner wall 31 of the air inlet 3 guides towards the upstream the reverse air flow F-INV having traversed successively the secondary flow path 7 and the fan 5, so that it opposes the upstream air flow F, notably in a radially outer manner, which enables braking. In certain cases, just as in thrust phase P1, an inner air flow F-INT coming from the upstream air flow F circulates from upstream to downstream in the nacelle 200, in a radially inner manner and in the opposite direction with respect to the reverse air flow F-INV, in order to supply the primary air flow F1. The primary air flow F1 may also be supplied by a part of the reverse air flow F-INV which bypasses the casing 800. At the level of the air inlet 3, the reverse air flow F-INV guided by the upstream inner wall 31 has a twisted motion V along the longitudinal axis generated by the blades of the fan 5. Such a twisted motion V can be transmitted to the outer air flow F-EXT guided by the upstream outer wall 32 of the air inlet 3 and flowing from upstream to downstream along the nacelle 2.

The invention more particularly relates to the air outlet 4 of the nacelle 2, which, in an analogous manner to the air inlet 3 and with reference to FIGS. 4 and 5, comprises a downstream inner wall 41 turned towards the longitudinal axis X and a downstream outer wall 42 opposite to the inner wall aval 41, connected together downstream by a trailing edge 43.

Figure 7:
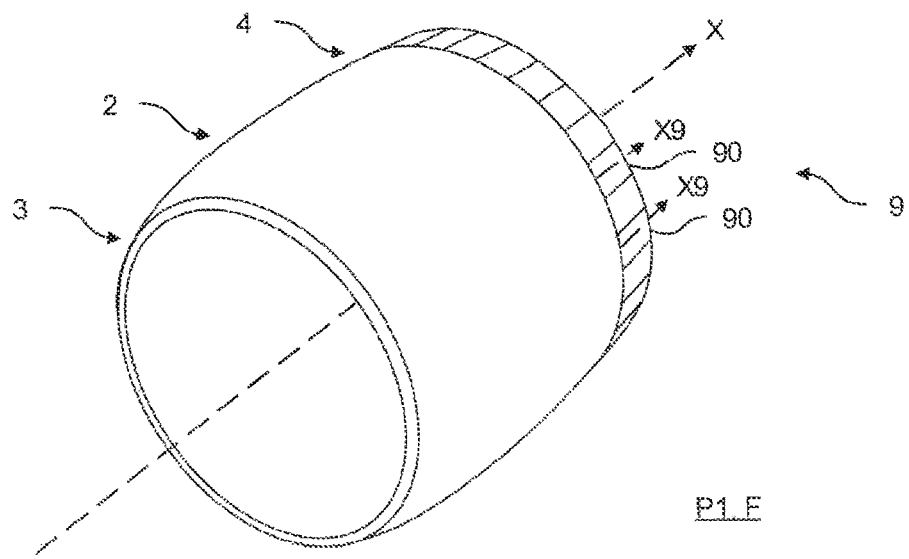
FIG. 7 and FIG. 8 are schematic representations in perspective of the nacelle respectively during the thrust phase and during the reverse thrust phase according to one embodiment of the invention.
Figure 8:
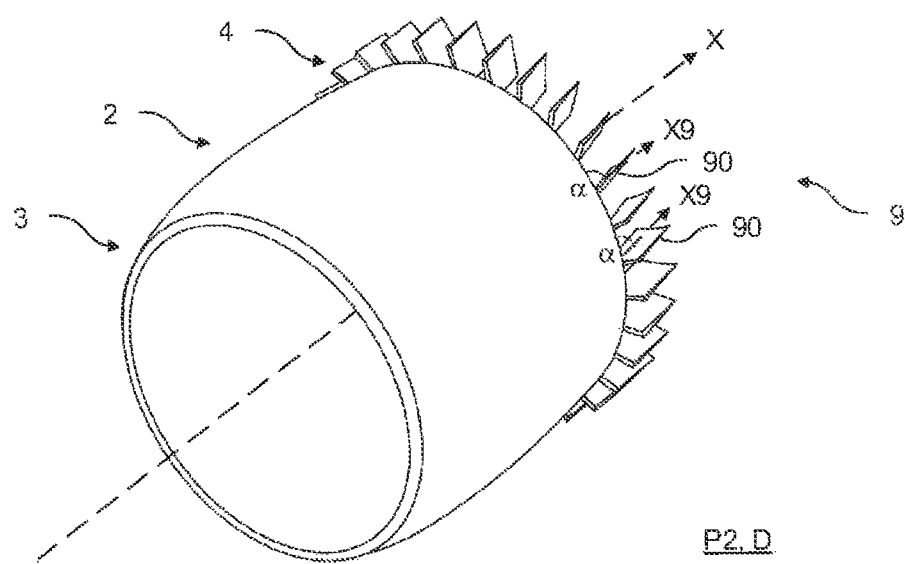

According to the invention, with reference to FIGS. 6, 7 and 8, the air outlet 4 further comprises a straightening device 9 comprising a plurality of flaps 90 mounted circumferentially on the trailing edge 43 and extending projecting downstream. Each flap 90 is pivotably mounted between two positions along a pivoting axis X9 forming with respect to the longitudinal axis an angle of convergence β comprised between 0° and 45° in a radial plane. The two positions of each flap 90 are:
- a closed position F illustrated in FIGS. 4 and 7, wherein each flap 90 extends along the pivoting axis X9 in the aerodynamic extension of the trailing edge 43, and
- a deployed position D illustrated in FIGS. 5, 6 and 8, wherein each flap 90 extends in a deployed plane forming an angle of deployment α with respect to the closed position F around the pivoting axis X9, said angle of deployment α being greater than 20°.

To carry out the pivoting of the flaps 90 from the closed position F to the deployed position D and vice versa, the straightening device 9 further comprises one or more pivoting members 97 as well as the pivots 98 (see FIGS. 9 and 10) on which are mounted the flaps 90. The pivots 98 are connected to the pivoting members 97 and extend cantilevered downstream, as will be detailed hereafter.

In certain embodiments of the invention, the straightening device 9 further comprises one or more splines fixedly mounted on the trailing edge 43 between the flaps 90. In the example described below with reference to FIGS. 4 to 12, the straightening device 9 only comprises flaps 90. A straightening device 9 comprising splines between the flaps 90 is presented later with reference to FIGS. 13 to 15.

Thanks to the invention, the air outlet 4 comprises a profile that is adapted and efficient both in thrust phase P1, by placing the flaps 90 in closed position F, and in reverse thrust phase P2, by placing the flaps 90 in deployed position D.

Indeed, during a reverse thrust phase P2, with reference to FIG. 6, the reverse air flow F-INV circulating in the secondary flow path 7 is admitted at the level of the air outlet 4 by withdrawal of the outer air flow F-EXT. More precisely, the outer air flow F-EXT flowing from upstream to downstream along the nacelle 2 is guided by the downstream outer wall 43 of the air outlet 4 then traverses the straightening device 9 to form the reverse air flow F-INV admitted into the secondary flow path 7. Advantageously, the twisted motion V of the outer air flow F-EXT is modified on the passage of the straightening device 9 which makes it possible to straighten the reverse air flow F-INV admitted into the air outlet 4. Such a straightened reverse air flow F-INV increases the performances in reverse thrust phase P2. The reverse air flow F-INV thus circulates in an opposite manner to the inner air flow F-INT which enables optimal braking, but also protects the engine from a pumping phenomenon and facilitates the operability of the aircraft in unfavorable meteorological conditions.

Figure 1:
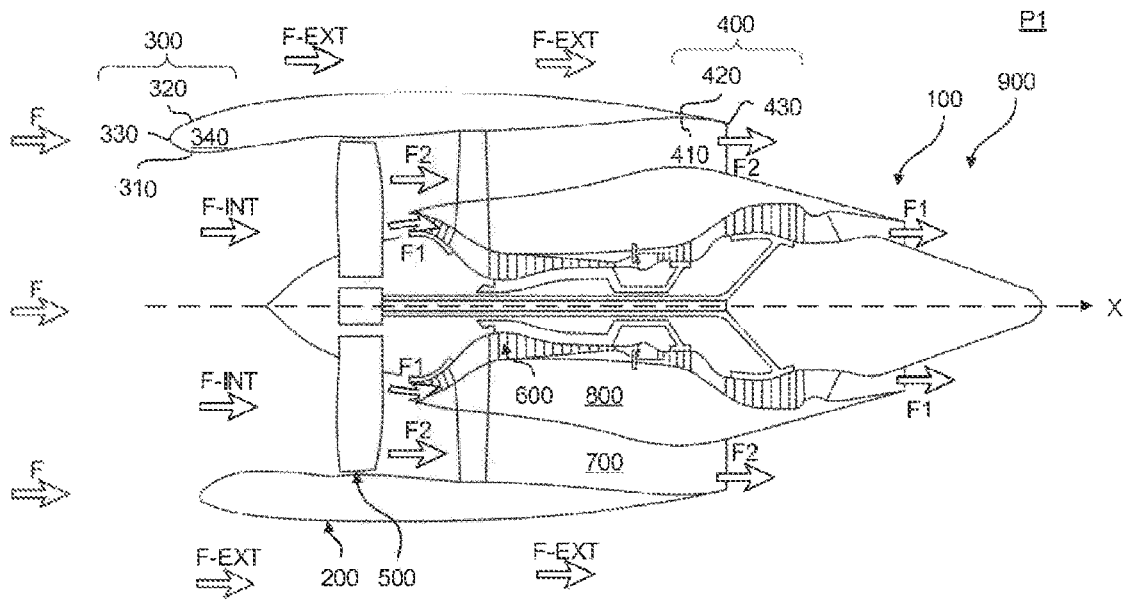
FIG. 1 is a longitudinal schematic representation of an aircraft propulsion assembly during a thrust phase of the bypass turbojet engine according to the prior art.
Figure 2:
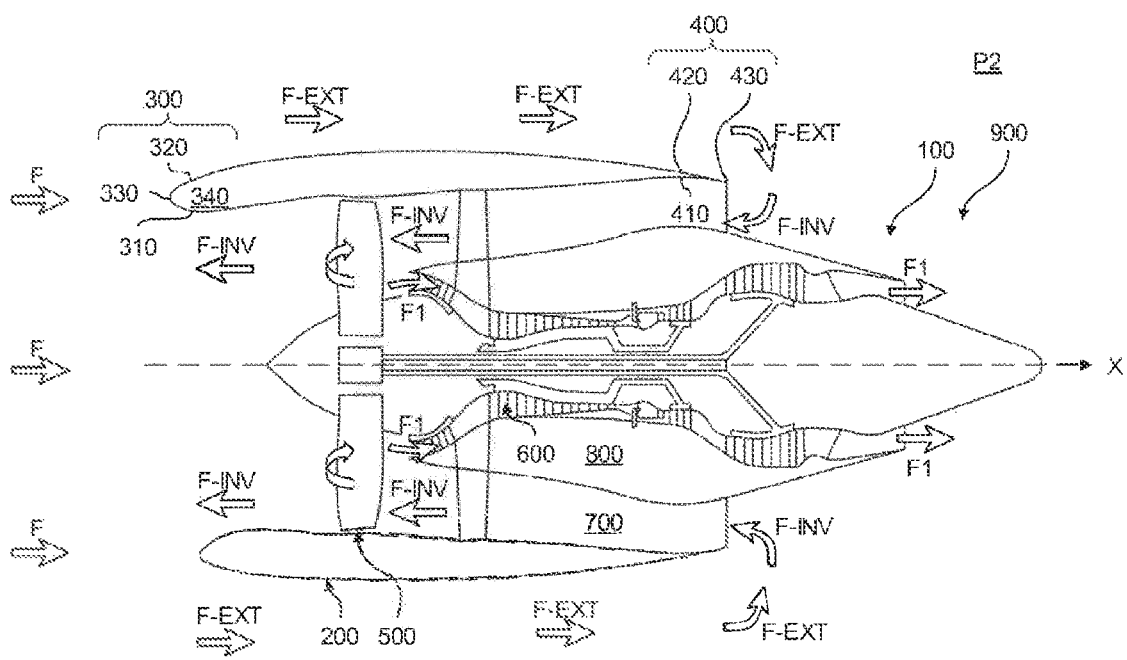
FIG. 2 is a longitudinal schematic representation of the aircraft propulsion assembly of FIG. 1 during a reverse thrust phase of the bypass turbojet engine.
Figure 3:
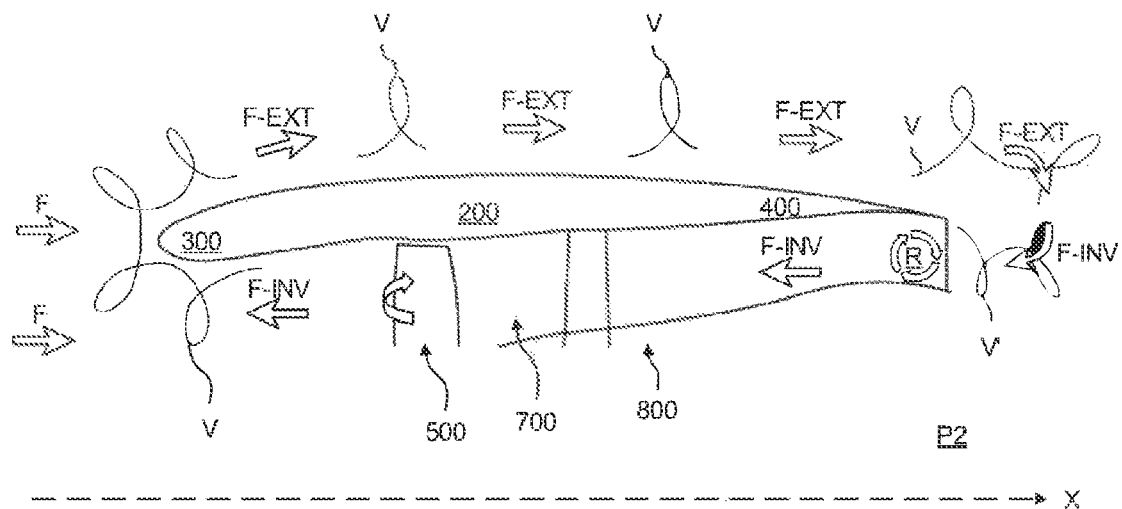
FIG. 3 is a schematic representation in longitudinal half-section of a nacelle of the aircraft propulsion assembly of FIG. 2.

In addition, the straightening device 9 prevents the formation of recirculation zones R in the secondary flow path at the level of the air outlet as illustrated in FIG. 3 of the prior art. Indeed, the outer air flow F-EXT traverses the straightening device 9 while circulating between the flaps 90 instead of bypassing the trailing edge 43 as in the prior art. The straightening device 9 thus avoids the disengagement of the outer air flow F-EXT from the downstream outer wall 420 of the air outlet, behind the formation of recirculation zones R.

In the example of FIGS. 7 and 8, during a thrust phase P1, the straightening device 9 extends in the aerodynamic extension of the trailing edge 43 of the air outlet 4, that is to say that it is substantially in the form of a ring along the longitudinal axis X. Advantageously, the secondary air flow F2 of the secondary flow path 7 is aerodynamically guided to the exterior of the turbojet engine 1. Preferably and as illustrated in FIG. 6, the straightening device 9 forms a ring converging from upstream to downstream. Thus, in deployed position D, the section of the air outlet 4 is increased in comparison with the closed position F, which makes it possible to increase the flow rate of reverse air flow F-INV in the secondary flow path 7.

In practice, the angle of convergence β is preferably less than 20°, preferentially less than 15°, as illustrated in FIG. 6, so as to conserve the performances in thrust phase P1 and to facilitate a substantially longitudinal admission of the reverse air flow F-INV in reverse thrust phase P2. Also in practice, the angle of deployment α is for its part preferably comprised between 30° and 135°, preferentially comprised between 40° and 90°. The optimal angle of deployment α is chosen in this range as a function of the engine speed and the direction of gyration of the engine as well as the quantity of reverse air flow F-INV that it is wished to admit into the secondary flow path 7.

Hereafter are described more precisely the structural and functional characteristics of the straightening device 9.

In the example of FIGS. 7 and 8, the straightening device 9 comprises thirty or so flaps 90 mounted circumferentially on the trailing edge 43. Advantageously, such a number of flaps 90 makes it possible to modify efficiently the twisted motion V of the outer air flow F-EXT, namely in each of the positions of the flaps 90. A corridor is delimited between two adjacent flaps 90 in deployed position D to guide the outer air flow F-EXT, and thus straighten efficiently the reverse air flow F-INV. It goes without saying that such a number of flaps 90 is adapted to an air outlet 4 of large diameter, that is to say of a turbojet engine 1 with a bypass ratio greater than 16 and that it could be adapted to an air outlet 4 of smaller diameter. Preferably, the number of flaps 90 is greater than 20, preferentially greater than 30 for an efficient straightening of the reverse air flow F-INV. Also preferably, the number of flaps 90 is less than 50 to limit the bulk, the cost and the on-board mass.

Still in the example of FIGS. 7 and 8, the flaps 90 are evenly distributed on the circumference of the trailing edge 43 of the air outlet 4 in order to obtain a reverse air flow F-INV straightened in a homogeneous manner in every radial position of the secondary flow path 7. However, it goes without saying that the flaps 90 could be mounted in a closer manner in one or more portions of the circumference of the trailing edge 43 where the twisted motion V is more intense. Conversely, the flaps 90 could be mounted in a more distant manner in one or more portions of the circumference of the trailing edge 43 where the twisted motion V is less intense.

Hereafter are described a single flap 90, the following description being valid for each of the flaps 90 of the straightening device 9. Preferably, all the flaps 90 are identical to ensure a homogeneous straightening of the reverse air flow F-INV. However, it goes without saying, notably in the case of a heterogeneous twisted motion V in one or more radial portions of the circumference of the trailing edge 43, that one or more flaps 90 may have a different shape and size.

Figure 9:
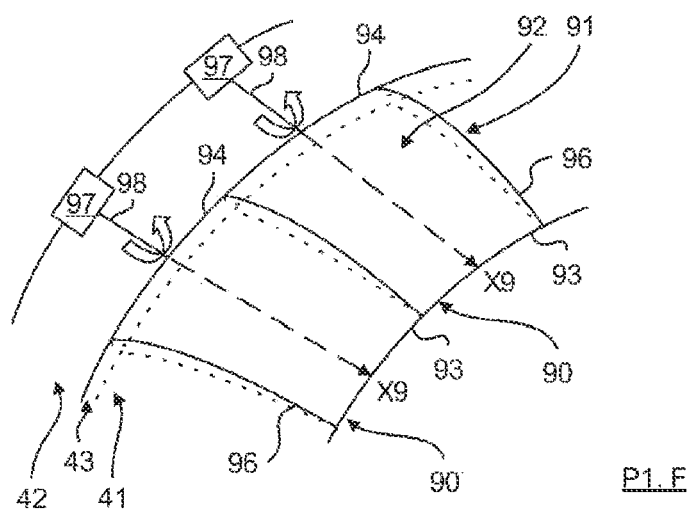
FIG. 9 and FIG. 10 are schematic representations in perspective of the flaps of the nacelle respectively during the thrust phase and during the reverse thrust phase according to one embodiment of the invention.
Figure 10:
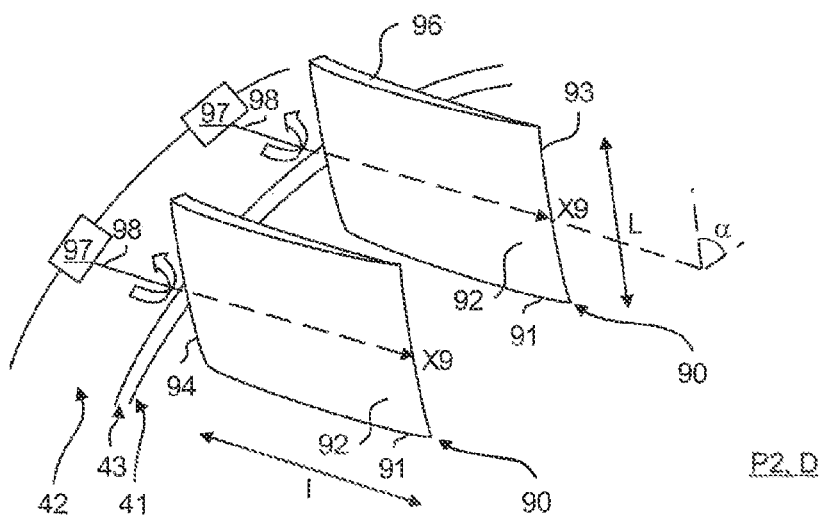

With reference to FIGS. 9 and 10, a flap 90 comprises, in closed position F, an inner wall 91 and an outer wall 92 extending respectively in the extension of the downstream inner wall 41 and the downstream outer wall 42 of the air outlet 4. The inner wall 91 and the outer wall 92 are connected downstream by a top 93, upstream by a base 94 and laterally by lateral edges 96.

Still with reference to FIGS. 9 and 10, the inner wall 91 and the outer wall 92 comprise a curved inwards shape, such that the diameter of the straightening device 9 at the upstream position of the base 94 is greater than its diameter at the downstream position of the top 93. Such a curved shape confers an aerodynamic profile to the air outlet 4 in thrust phase P1. Indeed, the inner wall 91 and the outer wall 92 guide respectively the inner air flow F-INT and the outer air flow F-EXT while avoiding any disengagement. Such a curved shaped also facilitates, in reverse thrust phase P2, the withdrawal of the outer air flow F-EXT to form the reverse air flow F-INV. Indeed, the curved shape added to the angle of deployment α of the flaps 90 delimits aerodynamic circulation corridors for the outer air flow F-EXT, which improves the straightening.

Still with reference to FIGS. 9 and 10, the top 93 comprises a radial thickness less than that of the base 94, such that the straightening device 9 comprises a profile tapering downstream reproducing the tapered profile of the air outlet of the prior art. In other words, in closed position F, the top 93 forms a trailing end corresponding to the trailing edge of the air outlet of the prior art. Advantageously, the performances in thrust phase P1 are conserved.

Still with reference to FIGS. 9 and 10, a flap 90 comprises a length l defined as the longitudinal distance separating the base 94 from the top 93 which is greater than 20 cm, so that in reverse thrust phase P2, all of the outer air flow F-EXT configured to form the reverse air flow F-INV traverses the straightening device 9. The length l of a flap 90 is furthermore preferably less than 50 cm, so as to guarantee its robustness and its durability. Indeed, such a length l range limits the force exerted by the turbulence of the surrounding air as well as the vibrations and shocks linked to an aeronautic environment on a flap 90 mounted projecting on the trailing edge 43.

Still with reference to FIGS. 9 and 10, a flap 90 comprises a width L defined as the circumferential distance separating the lateral edges 96 in closed position F, which is at least equal to the ratio of the circumference of the straightening device 9 over the number of flaps 90 of said straightening device 9. Preferably, the width L of a flap 90 is greater than such a ratio, so that the flaps 90 overlap each other in closed position F. In other words, the inner wall 91 of a flap 90 is in contact with the outer wall 92 of an adjacent flap 90.

In this example, all of the flaps 90 have the same length l and the same width L in order to obtain a homogeneous straightening of the reverse air flow F-INV but it goes without saying that one or more flaps could have a different length l and/or a width L, in particular to obtain a targeted straightening on one or more angular portions of the circumference of the trailing edge 43.

Advantageously, the overlap of the flaps 90 guarantees the sealing of the straightening device 9 when the flaps 90 are in closed position F. The overlap of the flaps 90 also advantageously facilitates the pivoting of the flaps 90 from the closed position F to the deployed position D and vice versa, while driving one another. Indeed, the deployment of a flap 90 drives that of the adjacent flap 90 and so on. Preferably, the overlap is partial, preferentially over less than 25% of the width L of a flap 90, in order to limit the on-board mass of the straightening device 9.

Figure 11:
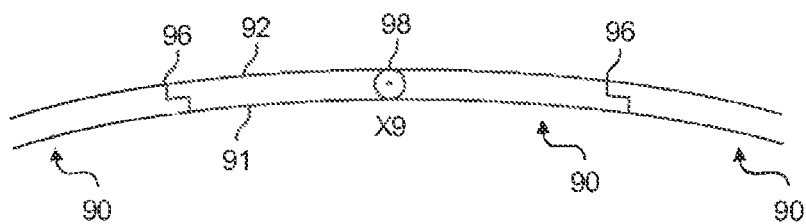
FIG. 11 and FIG. 12 are schematic representations in transversal section of the flaps of the nacelle according to two embodiments of the invention.

In the example of FIG. 11, to avoid any local radial overthickness linked to the overlap, the flaps 90 comprise lateral edges 96 of reduced radial thickness. The lateral edges 96 of adjacent flaps 90 thus advantageously cooperate by complementarity of shapes in order to have a radial thickness substantially constant at the periphery. The outer wall 92 and the inner wall 91 of a flap 90 thus extend in the continuity respectively of the outer wall 92 and the inner wall 91 of the adjacent flaps 90. Advantageously, such lateral edges 96 of reduced thickness generate a more aerodynamic profile of the air outlet 4.

Also preferably, the flaps 90 comprise a composite material in order to have great mechanical strength notably faced with the shocks and vibrations linked to an aeronautic environment while having a small on-board mass, which facilitates their cantilevered support.

Hereafter are described more precisely the pivoting member 97 and the pivot 98 associated with each flap 90 and configured to realize together the pivoting of the flaps 90 from the closed position F to the deployed position D and vice versa.

With reference to FIGS. 9 to 11 and as described previously, each flap 90 is fixedly mounted on a pivot 98 along the pivoting axis X9 of the considered flap 90. The pivot 98 is connected to a pivoting member 97 configured to rotationally drive it around the pivoting axis X9 along the angle of deployment α, so as to pivot the flap 90 from the closed position F to the deployed position D, or vice versa.

Preferably, the air outlet 4 comprises abutment means which are configured to limit the angular deployment to that between the closed position F and the deployed position D. As an example, the pivots 98 preferably comprise projecting slugs configured to confine the pivoting of the flaps 90 while coming into abutment with the pivoting members 97. Each pivot 98 thus comprises a first slug forming an abutment at the level of the maximum deployed position D, during the passage from the closed position F to the deployed position D. Similarly, each pivot 98 comprises a second slug forming an abutment at the level of the closed position F during the passage from the deployed position D to the closed position F. It goes without saying that the angular deployment could be limited other than by slugs in abutment at the level of the deployed D and closed F positions.

More precisely, the pivot 98 extends cantilevered downstream from the trailing edge 43 of the air outlet 4, which makes it possible to displace easily and with low bulk the associated flap 90. Preferably, the pivot 98 is in the form of a rod, so as to have sufficient mechanical strength as well as a low on-board mass. The pivot 98 preferably comprises steel for the same reasons.

With reference to FIGS. 9 to 11, each pivoting member 97 is mounted in the air outlet 4, so as not to disrupt the flow of the outer air flow F-EXT and the reverse air flow F-INV and to limit the bulk. According to one aspect of the invention, each flap 90 is connected to a pivot 98 itself connected to a pivoting member 97, so as to be able to pivot each flap 90 independently, according to a specific angle of deployment α. Preferably and as illustrated in FIGS. 9 and 10, the pivoting members 97 are connected together so as to pivot in a simple and practical manner simultaneously the flaps 90 from the closed position F to the deployed position D, and vice versa. According to another preferred aspect of the invention, the pivots 98 are connected to a single pivoting member 97, being as an example in the form of a wheel along the longitudinal axis X. Advantageously, such a wheel makes it possible to displace, by simple pivoting, all of the flaps 90 simultaneously and by a same angle of deployment α. Such a wheel thus makes it possible to modify the admission of the reverse air flow F-INV homogeneously on the circumference of the trailing edge 43.

In an alternative manner, to modify the admission of the reverse air flow F-INV heterogeneously on the circumference of the trailing edge 43, for example to eliminate local recirculation zones, a single pivoting member 97, such as a wheel, connected to pivots 98 of different sizes is used. Advantageously, such a wheel makes it possible to displace, by simple pivoting, all of the flaps 90 simultaneously along an angle of deployment α specific to the pivot 98.

In the example of FIGS. 9 to 11, the flaps 90 are furthermore mounted centrally on each pivot 98, so that the pivoting force provided by a pivoting member 97 is minimal.

Figure 12:
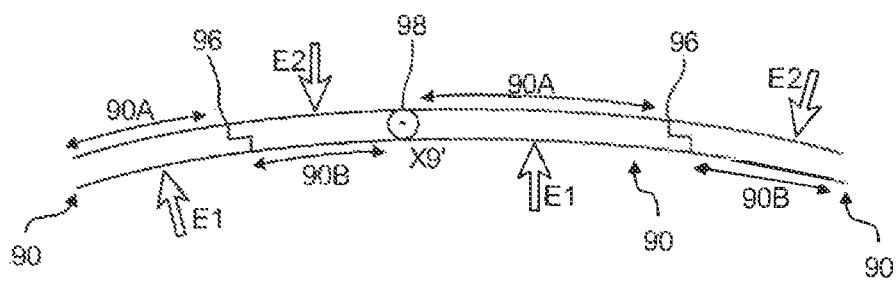

In the example of FIG. 12 illustrating an alternative embodiment of the invention, the flaps 90 are mounted along an off-centered pivoting axis X9' with respect to the width L of the flaps 90. The off-centered pivoting axis X9' of each flap 90 thus delimits a reduced portion of flap 90B and an extended portion of flap 90A. Advantageously, this makes it possible to guarantee the sealing of the straightening device 9 in thrust phase P1. Indeed, the secondary air flow F2 circulating in the secondary flow path 7 exerts a greater outwards radial pressure force E1 on each extended portion of flap 90A which generates an inwards radial pressure force E2 on each reduced portion of flap 90B. An extended portion of flap 90A that would tend to deploy is thus retained by the reduced portion of flap 90B overlapping it, on account of the sum of the forces being exerted on each pivot 98. Advantageously, the extended portion of flap 90A is configured to be overlapped by the reduced portion of flap 90B in closed position F, notably thanks to the lateral edges 96 comprising a thinned radial thickness. Thus, it is possible to do without pivoting member 97 to pivot the flaps 90 from the deployed position D to the closed position E, by judiciously using the secondary air flow F2. Otherwise, in the event of failure of the pivoting members 97, the flaps 90 are naturally displaced in closed position F by the circulation of the inner air flow F-INT. The performances thus remain optimal despite the failure.

Figure 13:
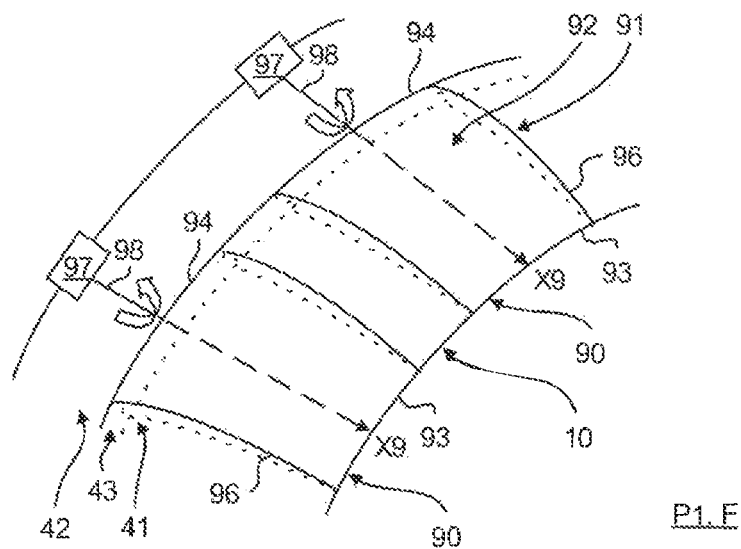
FIG. 13 and FIG. 14 are schematic representations in perspective of the flaps of the nacelle respectively during the thrust phase and during the reverse thrust phase according to an alternative embodiment of the invention.
Figure 14:
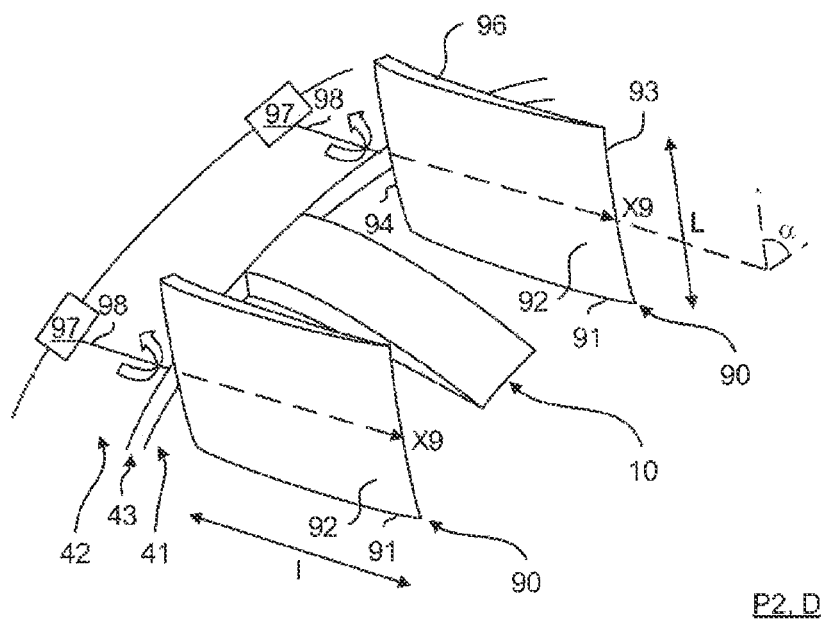
Figure 15:
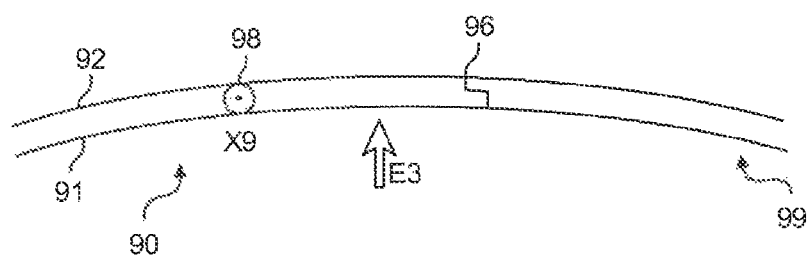
FIG. 15 is a schematic representation in transversal section of the flaps of the nacelle according to an alternative embodiment the invention.

Hereafter are described, according to another embodiment of the invention illustrated in FIGS. 13 to 15, a straightening device 9 comprising in addition to the flaps 90 one or more spline(s) 99 fixedly mounted on the trailing edge 43 between the flaps 90. Each spline 99 is mounted so as to form with the flaps 90 a ring along the longitudinal axis X. In other words, a spline 99 extends in an identical manner to a flap 90 in closed position F.

According to a first configuration, the straightening device 9 comprises an alternation of flaps 90 and splines 99, the splines 99 having the aim of increasing the mechanical strength of the straightening device 9 faced with the vibrations and shocks linked to an aeronautic environment. Preferably, as illustrated in FIG. 15, the flaps 90 are configured to abut against the splines 99 in closed position F, more precisely in radial abutment E3. The splines 99 thus also contribute to guaranteeing the sealing of the straightening device 9 in closed position F and to avoid that the flaps 90 deploy in an inopportune manner. In the example of FIG. 15, the abutment is achieved by an overlap of the flaps 90 by the splines 99. Such an overlap is similar to that illustrated in FIGS. 11 and 12 and described previously. Similarly for FIGS. 11 and 12, the flaps 90 are configured to pivot along a central pivoting axis X9 for a minimum pivoting force, such as illustrated in FIG. 15, or along an off-centered pivoting axis X9', making it possible to use judiciously the secondary air flow E2 to pivot the flaps 90 in closed position F autonomously.

According to a second configuration, the straightening device 9 comprises flaps 90 mounted on one or more angular portion(s) of the circumference of the trailing edge 43. One or more splines 99 are mounted on the complementary angular portion(s). Such a configuration makes it possible to straighten the reverse air flow F-INV in a targeted manner at the level of the flaps 90, so as to eliminate local recirculation zones identified as examples. In such a configuration, the splines 99 have the role of conserving the aerodynamic profile of the air outlet 4 in thrust phase P1, by forming with the flaps 90 a ring along the longitudinal axis X.

Preferably, the splines 99 have a shape and a size similar to those of the flaps 90, such as described previously. In particular, the splines 99 comprise a trailing end similar to that of the flaps 90 and a similar length. It goes without saying that the splines may however be of different shape and/or size, in particular their width, which depends on the desired straightening for the reverse air flow F-INV and the necessary mechanical strength.

Hereafter are described a method for using an air outlet 4 of aircraft propulsion assembly E comprising a straightening device 9 such as described previously, namely comprising flaps 90 and optionally one or more fixed splines 99. It is considered that the aircraft turbojet engine is initially in thrust phase P1 and that the flaps 90 of the straightening device 9 are in closed position F. In other words, the top 93 of the flaps 90 forms the trailing end of the air outlet 4.

During a reverse thrust phase P2, the pitch angle of the blades of the fan 5 is modified so as to reverse the direction of the secondary air flow F2 circulating in the secondary flow path 7 in the reverse air flow F-INV, so as to facilitate a deceleration of the aircraft. According to the invention, parallel to the modification of the pitch angle of the blades of the fan 5, the flaps 90 are pivoted by an angle of deployment α greater than 20°, by actuating one or more pivoting members 97, such as by pivoting a wheel connected to all of the flaps 90. The pivoting of a single wheel advantageously makes it possible to pivot the flaps 90 in a simultaneous, simple, rapid manner and according to a same angle of deployment α. The flaps 90 extending initially in the extension of the trailing edge 43 of the air outlet 4 in closed position F then delimit in deployed position D flow corridors for the outer air flow F-EXT.

In deployed position D, the flaps 90 straighten the twisted motion V of the outer air flow F-EXT so as to improve the admission of the reverse air flow F-INV into the secondary flow path 7 and thus to increase the performances in reverse thrust phase P2. The flaps 90 further prevent the formation of recirculation of the outer air flow F-EXT downstream of the air outlet 4. In the case of a straightening device 9 with flaps 90 converging from upstream to downstream and without spline 99, the flaps 90 in deployed position D further increase the diameter of the air outlet 4, which increases the flow rate of the admitted reverse air flow F-INV. Indeed, since the flaps 90 are converging, the diameter of the air outlet 4 is defined between the trailing edges 43 and no longer between the tops 93 of the flaps 90.

During a new thrust phase P1, the pitch angle of the blades of the fan 5 is modified again so as to re-establish the secondary air flow F2 flowing from upstream to downstream. According to the invention, parallel to the modification of the pitch angle of the blades of the fan 5, the flaps 90 are pivoted in reverse direction by the same angle of deployment α from the deployed position D to the closed position F. The flaps 90 then form together the trailing end of the air outlet 4, optionally with the splines 99, and make it possible to conserve the performances in thrust phase P1 with an aerodynamic profile.

According to one embodiment of the invention, the step of pivoting the flaps 90 from the closed position F to the deployed position D and the reverse pivoting step from the deployed position D to the closed position F are implemented by one or more pivoting member(s) 97. According to another embodiment of the invention, the reverse pivoting step is implemented autonomously by the flaps 90, by advantageously exploiting the secondary air flow F2 and more precisely the radial force that it generates on the flaps 90 to fold them back.

In conclusion, the air outlet 4 according to the invention has a profile adapted to each of the thrust P1 and reverse thrust P2 phases, aerodynamic of shape tapering downstream in thrust phase P1 and having circulation corridors for the outer air flow F-EXT in reverse thrust phase P2. Such an air outlet 4 notably improves the performances in reverse thrust phase P2 by modifying the twisted motion V of the outer air flow F-EXT brought about upstream by the fan 5 and by improving the admission of the direction and the flow rate of the reverse air flow F-INV in the secondary flow path 7. The flaps 90 further guarantee the sealing in closed position F thanks to the overlap of the edges 96 and to the off-centered pivoting axis X9'. All of the pivots 98 driven by a single wheel further make it possible to pivot the flaps 90 in a rapid, simple, practical and simultaneous manner, while limiting the bulk and the on-board mass, which makes it possible to adapt to rapid or repeated phase changes. The fixed splines 99 further improve the mechanical strength of the straightening device, making it possible to realize a targeted straightening at the identified recirculation zones and serve as abutment for the flaps 90.

In a preferred manner, to form an air outlet 4 according to the invention, the length of an air outlet according to the prior art is reduced to provide the flaps 90. The longitudinal bulk of the air outlet 4 advantageously remains unchanged.

The invention claimed is:

1. An air outlet of a nacelle for a bypass turbojet engine having a bypass turbojet engine extending along a longitudinal axis and comprising a radially inner primary flow path and a radially outer secondary flow path wherein a secondary air flow circulates from upstream to downstream during a thrust phase and a reverse air flow from downstream to upstream circulates during a reverse thrust phase, said nacelle forming a revolution around the longitudinal axis of the bypass turbojet engine, said air outlet comprising (1) a downstream inner wall that is turned towards the longitudinal axis and configured to externally delimit the secondary flow path and to guide the secondary air flow and the reverse air flow, (2) a downstream outer wall, opposite to the downstream inner wall, configured to guide an outer air flow circulating from upstream to downstream, said downstream inner wall and said downstream outer wall being connected together downstream by a trailing edge, and (3) a straightening device comprising a plurality of flaps mounted on the trailing edge and projecting downstream from the trailing edge, each flap of the plurality of flaps being mounted along a pivoting axis forming with respect to the longitudinal axis, an angle of convergence of between 0° and 45° in a radial plane, and wherein each flap being pivotably mounted between:

a closed position, wherein each flap extends along the pivoting axis in an aerodynamic extension of the trailing edge to facilitate the thrust phase, and a deployed position, wherein each flap extends in a deployed plane forming an angle of deployment with respect to the closed position around the pivoting axis, said angle of deployment being greater than 20° to straighten the reverse air flow admitted into said air outlet so as to facilitate the reverse thrust phase.

2. The air outlet according to claim 1, wherein in the closed position, the plurality of flaps converge along the longitudinal axis and oriented from upstream to downstream.

3. The air outlet according to claim 1, wherein in the closed position, the plurality of flaps are mounted adjacent one another to form a ring-like shape along the longitudinal axis.

4. The air outlet according to claim 1, wherein, the plurality of flaps overlap in the closed position.

5. The air outlet according to claim 4, wherein the plurality of flaps overlap over less than 25% of a circumferential length of the plurality of flaps in the closed position.

6. The air outlet according to claim 1, wherein the straightening device comprises at least one spline fixedly mounted on the trailing edge and projecting downstream, said at least one spline and the plurality of flaps in the closed position are mounted adjacent one another so as to form a ring-like shape along the longitudinal axis.

7. The air outlet according to claim 6, wherein in closed position, at least one of the plurality of flaps is in radial abutment against said at least one spline.

8. The air outlet according to claim 7, wherein at least one of the plurality of flaps is in radial abutment over less than 25% of a circumferential length of said at least one of the plurality of flaps in the closed position.

9. The air outlet according to claim 1, wherein the straightening device comprises at least one pivoting member configured to pivot at least one of the plurality of flaps.

10. The air outlet according to claim 9, wherein the straightening device comprises a single pivoting member configured to simultaneously pivot at least some of the plurality of flaps.

11. The air outlet according to claim 1, wherein each of the plurality of flaps is pivotably mounted along a pivoting axis central to each of said plurality of flaps.

12. The air outlet according to claim 1, wherein the pivoting axis of each flap is off-centered with respect to a circumferential length of said flap in the closed position.

13. The air outlet according to claim 12, wherein each flap comprises an extended portion and a reduced portion separated by the off-centered pivoting axis, and wherein the extended portions of the plurality of flaps overlap in the closed position.

14. A nacelle for a bypass turbojet comprising the air outlet according to claim 1, wherein the nacelle has a downstream end and the air outlet is located at the downstream end of the nacelle.

15. An aircraft propulsion assembly comprising a bypass turbojet engine extending along a longitudinal axis and comprising a radially inner primary flow path and a radially outer secondary flow path wherein a secondary air flow circulates from upstream to downstream during a thrust phase and a reverse air flow circulates from downstream to upstream during a reverse thrust phase, said aircraft propulsion assembly comprising the nacelle according to claim 14 mounted on the bypass turbojet engine.

16. The aircraft propulsion assembly according to claim 15, comprising a reverse thrust means.

17. A method for using the aircraft propulsion assembly according to claim 15, wherein at least one flap is in the closed position during the thrust phase of the bypass turbojet engine, the method comprising, during the reverse thrust phase of said bypass turbojet engine, pivoting at least one of the plurality of flaps from the closed position to the deployed position.

18. An air outlet of a nacelle for a bypass turbojet engine having a bypass turbojet engine extending along a longitudinal axis and comprising a radially inner primary flow path and a radially outer secondary flow path wherein a secondary air flow circulates from upstream to downstream during a thrust phase and a reverse air flow from downstream to upstream circulates during a reverse thrust phase, said air outlet comprising (1) a downstream inner wall that is turned towards the longitudinal axis and configured to externally delimit the secondary flow path and to guide the secondary air flow and the reverse air flow, (2) a downstream outer wall, opposite to the downstream inner wall, configured to guide an outer air flow circulating from upstream to downstream, said downstream inner wall and said downstream outer wall being connected together downstream by a trailing edge, and (3) a straightening device comprising a plurality of flaps mounted on the trailing edge and projecting downstream from a trailing edge, each flap of the plurality of flaps being mounted along a pivoting axis having a structure with a diameter greater than 10 mm to support the plurality of flaps due to turbulence of external air flow and forming, with respect to the longitudinal axis, an angle of convergence of between 0° and 45° in a radial plane, and wherein each flap being pivotably mounted between:

a closed position, wherein each flap extends along the pivoting axis in an aerodynamic extension of the trailing edge to facilitate the thrust phase, and a deployed position, wherein each flap extends in a deployed plane forming an angle of deployment with respect to the closed position around the pivoting axis, said angle of deployment being greater than 20° to straighten the reverse air flow admitted into said air outlet so as to facilitate the reverse thrust phase.

19. The air outlet of claim 18, wherein the pivoting axis is cantilevered downstream at the trailing edge.

* * * * *